(12) United States Patent
Qiu (10) Patent No.: US 8,256,582 B2
(45) Date of Patent: Sep. 4, 2012

(54) METHODS AND DEVICES FOR SURVEYING ELEVATOR HOISTWAYS

(75) Inventor: Minglun Qiu, Bloomfield, CT (US)

(73) Assignee: Otis Elevator Company, Farmington, CT (US)

( * ) Notice: Subject to any disclaimer, the term of this patent is extended or adjusted under 35 U.S.C. 154(b) by 20 days.

(21) Appl. No.: 12/745,269

(22) PCT Filed: Dec. 7, 2007

(86) PCT No.: PCT/US2007/025065
§ 371 (c)(1),
(2), (4) Date: May 28, 2010

(87) PCT Pub. No.: WO2009/073010
PCT Pub. Date: Jun. 11, 2009

(65) Prior Publication Data
US 2010/0309452 A1    Dec. 9, 2010

(51) Int. Cl.
B66B 7/02 (2006.01)
B66B 1/34 (2006.01)
(52) U.S. Cl. .................. 187/406; 187/391; 187/394
(58) Field of Classification Search .................. 187/391, 187/393, 280, 406, 286, 249, 300, 394; 250/221, 250/559.38
See application file for complete search history.

(56) References Cited

U.S. PATENT DOCUMENTS

| 4,106,594 A * | 8/1978 | Kirsch et al. ................... 187/278 |
| 4,748,748 A | 6/1988 | Kirven |
| 5,373,123 A | 12/1994 | Skalski |
| 5,931,264 A * | 8/1999 | Gillingham et al. .......... 187/406 |
| 6,070,700 A * | 6/2000 | Nagel ............................ 187/335 |
| 6,435,315 B1 * | 8/2002 | Zaharia ........................ 187/394 |
| 6,437,315 B1 * | 8/2002 | Skalski ......................... 250/221 |
| 6,601,679 B2 * | 8/2003 | Crenella et al. ............... 187/395 |
| 6,877,587 B2 * | 4/2005 | Kunz et al. ................... 187/394 |
| 7,117,981 B2 * | 10/2006 | Logan et al. .................. 187/391 |
| 7,578,373 B2 * | 8/2009 | Shiratsuki et al. ............ 187/391 |

FOREIGN PATENT DOCUMENTS

| EP | 0905080 | 3/1999 |
| JP | 5472817 U1 | 12/1979 |
| JP | 59158780 A | 9/1984 |
| JP | 7242379 A | 9/1995 |
| JP | 08324911 | 12/1996 |
| JP | 11106158 | 4/1999 |

(Continued)

OTHER PUBLICATIONS

PCT International Search Report and Written Opinion, Aug. 27, 2008, 13 pages.
Rospatent Federal State Institution, Request of Substantive Examination, Aug. 12, 2011, 4 pages.
Intellectual Property Office, Office Action, Dec. 5, 2011, 3 pages.
Korean Office Action, Mar. 29, 2012, 5 pages.

(Continued)

*Primary Examiner* — Sang Nguyen
(74) *Attorney, Agent, or Firm* — Kinney & Lange, P.A.

(57) ABSTRACT

A device for surveying an enclosed structure (10) includes a platform (24) configured to longitudinally traverse the structure (10), at least one first distance) sensor (48) connected to the platform (24) and configured to measure a lateral distance between a point on the platform (24) and a wall of the structure (10), at least one second distance sensor (50) connected to the platform (24) and configured to measure a longitudinal distance between a point on the platform (24) and a first end of the structure (10), and a transport machine (22) configured to move the platform (24) substantially longitudinally within the structure (10).

25 Claims, 5 Drawing Sheets

FOREIGN PATENT DOCUMENTS

| | | |
|---|---|---|
| JP | 2001227949 A | 8/2001 |
| JP | 2004338831 A | 12/2004 |
| JP | 2005096919 A | 4/2005 |
| JP | 2007119102 | 5/2007 |
| JP | 2007261794 A | 10/2007 |
| WO | 9323323 | 11/1993 |

OTHER PUBLICATIONS

Japanese Patent Office, Japanese Office Action, Apr. 17, 2012, 3 pages.

* cited by examiner

METHODS AND DEVICES FOR SURVEYING ELEVATOR HOISTWAYS

BACKGROUND

The present invention relates to surveying elevator hoistways, in particular, to methods of and devices for performing such surveys.

The use of elongated rails to guide or support elevator cars is well known in the art. Elevator systems typically employ two rails arranged on opposite sides of the elevator car and running the entire length of the elevator hoistway. The elevator car, typically suspended by steel ropes or belts from the upper end of the hoistway, or by a hydraulic piston arranged at the hoistway bottom, is guided by the rails as it traverses the hoistway. Even slight deflections in rail segments or discontinuities between the segments may cause the traveling elevator car to sway or vibrate as it traverses the hoistway.

Properly aligning the rails in the hoistway to guard against rail imperfections depends in large part on deviations in the vertical walls of the hoistway to which the rails are attached. Surveying elevator hoistways is a time consuming, manual, and costly task in new elevator installations and modernizations of existing elevator systems. Hoistways are commonly surveyed manually by: (a) establishing a vertical reference, or plumb line, such as a weighted rope or cable hung from the top of the hoistway; and (b) manually measuring the horizontal distance between the plumb line and each of the four vertical hoistway walls at each floor landing. Prior hoistway surveying tools and methods are not only time consuming and costly, but are also subject to relatively large margins of error.

In light of the foregoing, the present invention aims to resolve one or more of the aforementioned issues that can affect elevator systems.

SUMMARY

A device for surveying an enclosed structure includes a platform configured to longitudinally traverse the structure, at least one first distance sensor connected to the platform and configured to measure a lateral distance between a point on the platform and a wall of the structure, at least one second distance sensor connected to the platform and configured to measure a longitudinal distance between a point on the platform and a first end of the structure, and a transport machine configured to move the platform substantially longitudinally within the structure.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Efforts have been made throughout the drawings to use the same or similar reference numerals for the same or like components.

Figure 1:
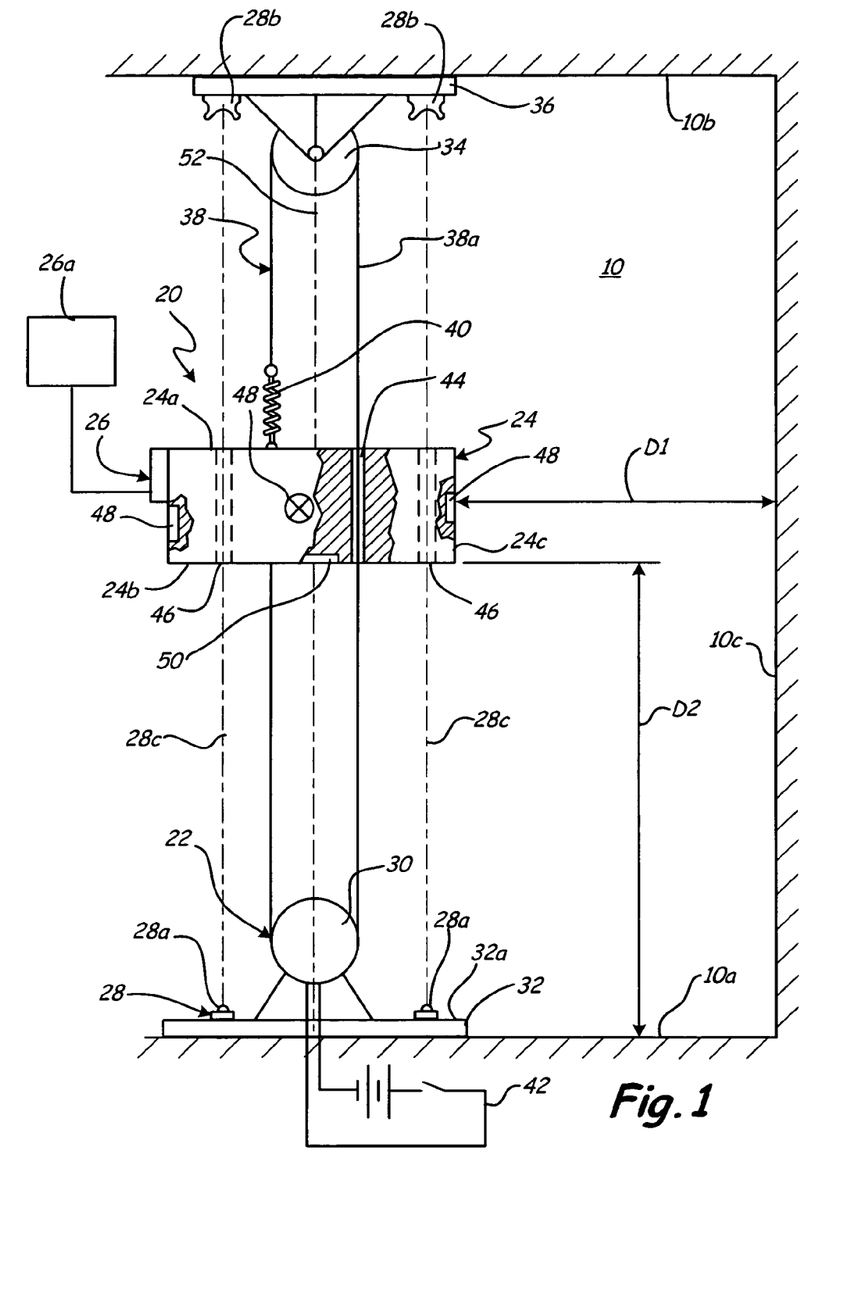
FIG. 1 is a front view of an elevator hoistway including an embodiment of a hoistway surveying system according to the present invention.

FIG. 1 is a front view of a structure in the form of an elevator hoistway 10 and a hoistway surveying system 20 according to the present invention. The hoistway surveying system 20 includes a transport machine 22, a platform such as an electronic measurement device (EMD) 24, an electronic control 26, and an optical alignment system 28. In FIG. 1, the EMD 24 may be connected to the transport machine 22, which machine 22 may be configured to cause the EMD 24 to traverse the hoistway 10. As the EMD 24 traverses the hoistway 10, the EMD 24 may be configured to measure distances, such as a lateral distance D1 between a side 24c of the EMD 24 and a wall 10c of the hoistway 10 and a longitudinal distance D2 between a bottom 24b of the EMD 24 and a bottom 10a of the hoistway. The electronic control 26 may be connected to the EMD 24 and configured to store and/or transmit measurement data gathered by the EMD 24 as the EMD 24 traverses the hoistway 10. The electronic control 26 may be, for example, a commercially available integrated circuit including a processor, digital memory, and wired or wireless communications components. The electronic control 26 may be connected (wirelessly or by wires) to a remote electronic device 26a, such as a printer, monitor, or computer, for outputting data gathered by the EMD 24 and transmitted by the control 26. The optical alignment system 28 may be configured to generate an optical longitudinal reference substantially perpendicular to a level lateral surface 32a arranged toward, for example, the bottom 10a of the hoistway 10.

In FIG. 1, the transport machine 22 may include a motor 30 that rotates a first sheave integrally provided therewith, a motor frame 32, a second sheave 34, a sheave frame 36, a traction member such as, and hereinafter referred to as, a rope 38, a tension component 40 such as a spring, and a power source 42 such as a battery. The tension component 40 may be configured to vary the tension in the rope 38 and may be connected between one end of the rope 38 and the EMD 24, for example, between the rope 38 and a top 24a of the EMD 24. The motor 30 may be mounted on the motor frame 32, which frame 32 may be connected to, for example, the bottom 10a of the hoistway 10. The sheave 34 may be mounted to the sheave frame 36, which frame 36 may be mounted to, for example, the top 10b of the hoistway 10. One end of the rope 38 may be connected to the tension component 40 at the top 24a of the EMD 24, then the rope 38 may wrap around the sheave 34 so that a side 38a of the rope 38 may then pass down through a rope guide hole 44 in the EMD 24. After passing through the hole 44, the rope 38 may then wrap around the motor 30 and terminate at a bottom 24b of the EMD 24.

The motor 30 may be powered by, for example, the power source 42, which power source 42 may be arranged inside or outside of the hoistway 10. The rope 38 wrapped around the motor 30 and the sheave 34 and appropriately tensioned by the tension component 40 creates a tension system, whereby rotary motion of the motor 30 and the sheave 34, which are connected via the rope 38, is translated into linear motion of the rope 38 up and down the hoistway, depending on the direction of rotation of the motor 30. The EMD 24 is connected to the transport machine 22 by connecting the rope 38 to the top 24a and the bottom 24b of the EMD 24. Motion of the rope 38, driven by rotation of the motor 30 (powered by the power source 42), thereby causes the EMD 24 to traverse the hoistway 10.

The optical alignment system 28 shown in FIG. 1 may include, for example, transmitters 28a and receivers 28b mounted to, for example, the motor frame 32 and the sheave frame 36 toward the bottom 10a and the top 10b of the hoistway 10. The transmitters 28a and receivers 28b may be, for example, beam (e.g., laser) or wave (e.g., radar) transmitters/receivers, or other transmitters/receivers; hereinafter, each of the various types of transmitters/receivers will be collectively referred to as "beam" transmitters/receivers and the transmitted/received signal shall be referred to as a "beam." Specifically, the alignment system 28 may be configured to generate beams 28c between respective transmitter 28a and receiver 28b pairs. The beams 28c transmitted by transmitters 28a and received by receivers 28b may be configured to lie in a single plane substantially perpendicular to a level lateral surface arranged toward, for example, the bottom 10a of the hoistway 10. For example, the top of the motor frame 32 may be configured to be a substantially level surface 32a and the transmitters 28a may be arranged on and configured to generate beams 28c that are substantially perpendicular to the level surface 32a. The beams 28c thereby may act to create an optical longitudinal reference substantially perpendicular to the level surface 32a, or, in other words, the beams 28c may act to create optical plumb lines representing substantially vertical references inside the hoistway 10.

The optical alignment system 28 and the EMD 24 may be arranged such that the beams 28c pass through alignment holes 46 in the EMD 24 when the EMD 24 is properly positioned in the hoistway 10 to make measurements, such as distance D1, that are substantially perpendicular to the beams 28c and thereby substantially parallel to the level surface 32a. In the event the orientation of the EMD 24 varies, such as by rotating or moving laterally inside the hoistway 10, the beams 28c may be interrupted, thereby signaling that the EMD 24 is not properly oriented in the hoistway 10 to make measurements.

The optical alignment system 28 may include a control device connected to the transmitters 28a and receivers 28b and configured to, for example, generate an alarm or discontinue measurements in the event the beams 28c are interrupted by the improperly oriented EMD 24. In another embodiment of the present invention, the alignment system 28 may include the transmitters 28a as shown in FIG. 1, but the receivers 28b may be mounted to the bottom 24b of the EMD 24. For example, the receivers 28b may include photosensor arrays mounted to the bottom 24b of the EMD 24 and configured to receive the beams (28c) transmitted by the transmitters 28a and to sense variations in the orientation of the EMD 24 in the hoistway 10.

Figure 2:
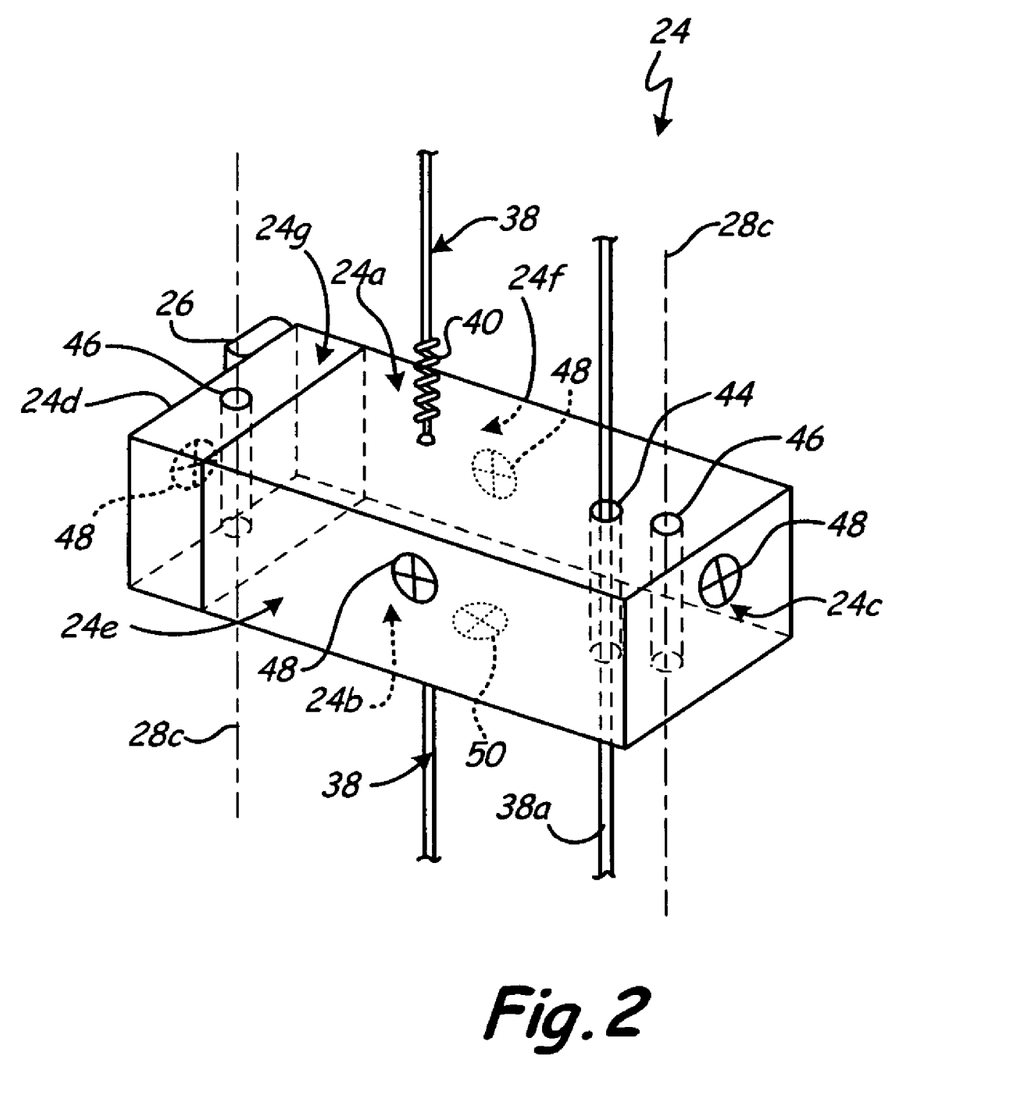
FIG. 2 is a perspective view of an electronic measuring device according to the hoistway surveying system embodiment shown in FIG. 1.

As shown in FIG. 1 and the enlarged perspective view of the EMD 24 in FIG. 2, the EMD 24 may include the rope guide hole 44, the alignment holes 46, lateral distance sensors 48, and a longitudinal distance sensor 50. As discussed above, the rope guide hole 44 may be configured to receive one side 38a of the rope 38, which may act to guide the travel of the EMD 24 in the hoistway 10. The EMD 24 may also include a balance weight 24g arranged toward the side 24d opposite the guide hole 44 and configured to reduce the force on the rope 38 passing through the guide hole 44. The alignment holes 46 may be configured to permit uninterrupted transmission of the beams 28c when the EMD 24 is properly positioned in the hoistway 10 to make measurements. The lateral distance sensors 48 may be connected to the sides 24c, 24d, 24e, 24f of the EMD 24. The longitudinal distance sensor 50 may be connected to the bottom 24b of the EMD 24. In another embodiment of the present invention, the EMD 24 may include more than one longitudinal distance sensor and one or more of the longitudinal sensors may be connected to the top 24a of the EMD 24.

Figure 3A:
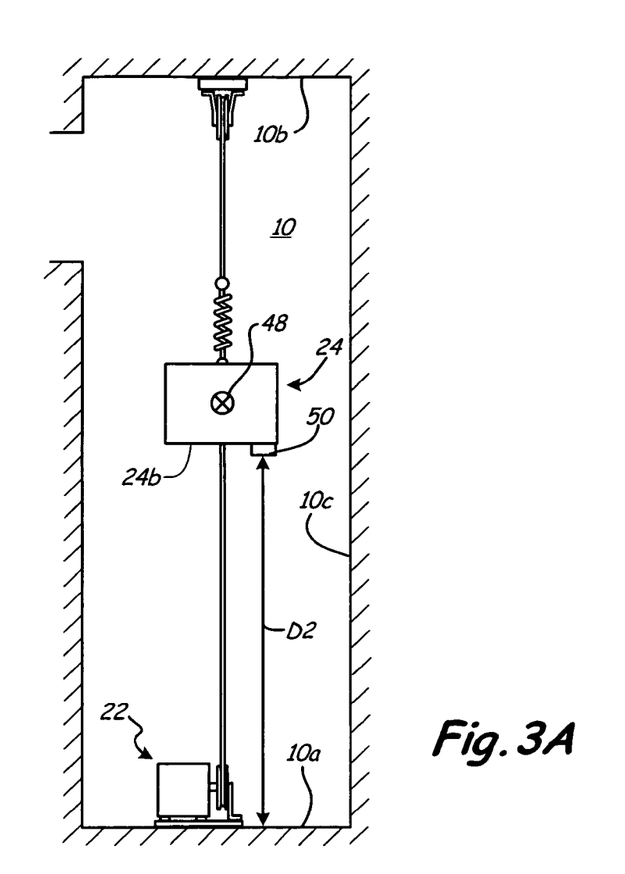
FIGS. 3A and 3B are side and top views, respectively, of the hoistway illustrating distance measurements made by the electronic measuring device shown in FIGS. 1 and 2.
Figure 3B:
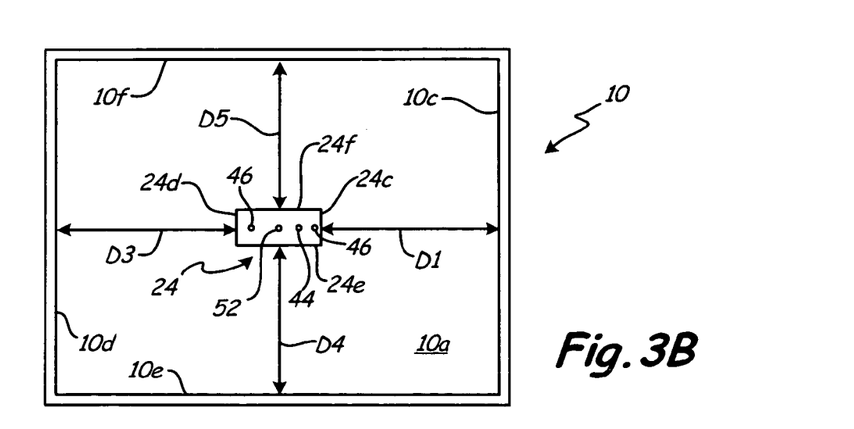

The lateral distance sensors 48 may be configured to measure lateral distances between the sides 24c, 24d, 24e, 24f of the EMD 24 and the corresponding walls 10c, and 10d, 10e, 10f shown in FIG. 3B of the hoistway 10 at different longitudinal positions of the EMD 24 inside the hoistway 10. In FIG. 1, the lateral distance sensors may be configured to measure, for example, the distance D1 between the side 24c of the EMD and the wall 10c of the hoistway 10 at different longitudinal positions of the EMD 24 inside the hoistway 10. The longitudinal position of the EMD 24 inside the hoistway 10 may be determined using the longitudinal sensor 50 to measure longitudinal distances, such as the distance D2 between the bottom 24b of the EMD 24 and the bottom 10a of the hoistway 10.

The lateral and longitudinal distance sensors 48, 50 may be, for example, commercially available electronic sensors, such as laser or ultrasonic distance sensors. Laser and ultrasonic distance sensors measure distances between the sensor and a reflective body by, for example, calculating the distance based on a measurement of the time required to transmit a signal, either a light or sound signal, to the body and receive the signal reflected off the body back to the sensor. Laser sensors may also employ triangulation or interferometery methods to measure relatively short distances, for example, distances less than two feet. Triangulation commonly includes projecting a beam of visible laser light onto the body, viewing the light reflected off the body from an angle with a digital camera, and calculating the distance to the body from image pixel data captured by the digital camera. Laser sensors employing interferometery methods may make measurements by calculating the distance to the reflective body from a measurement of the relative phase shift between two beams successively sent to and reflected off the body.

FIGS. 3A and 3B illustrate lateral and longitudinal distance measurements made by the EMD 24 shown in FIGS. 1 and 2. In FIG. 3A, the EMD 24 is positioned by the transport machine 22 inside the hoistway 10. The longitudinal position of the EMD 24 may be determined by the longitudinal sensor 50 measuring, for example, a distance D2 between the bottom 24b of the EMD 24 and the bottom 10a of the hoistway 10. In FIG. 3B, the EMD 24, at the same or a different longitudinal position as shown in FIG. 3A, may measure the lateral distances between the EMD 24 and the four walls of the hoistway 10. For example, the lateral sensor 48 connected to the side 24c of the EMD 24 may measure the distance D1 between the EMD 24 and the wall 10c of the hoistway 10. The lateral sensor 48 connected to the side 24d of the EMD 24 may measure a distance D3 between the EMD 24 and the wall 10d of the hoistway 10. The lateral sensor 48 connected to the side 24e of the EMD 24 may measure a distance D4 between the EMD 24 and the wall 10e of the hoistway 10. The lateral sensor 48 connected to the side 24f of the EMD 24 may measure a distance D5 between the EMD 24 and the wall 10f of the hoistway 10. As shown in FIGS. 1 and 3B, the EMD 24 may be substantially centered in the hoistway 10 such that, for example, the EMD 24 is substantially aligned with a vertical axis 52 of the hoistway 10.

The hoistway surveying system 20 shown in FIGS. 1-3B may thus survey the hoistway 10 when the transport machine 22 causes the EMD 24 to traverse the hoistway 10 and the EMD 24 makes lateral distance measurements between the EMD 24 and the walls of the hoistway 10 using the lateral distance sensors 48 at various longitudinal positions of the EMD 24 in the hoistway 10 as determined by the longitudinal sensor 50. The electronic control 26 may be configured to store and transmit measurement data gathered by the EMD 24. The optical alignment system 28 may be configured to generate an optical longitudinal reference substantially perpendicular to the level surface 32a of the motor frame 32, which optical longitudinal reference may act to determine whether the EMD 24 is properly oriented in the hoistway 10 to make measurements.

Figure 4:
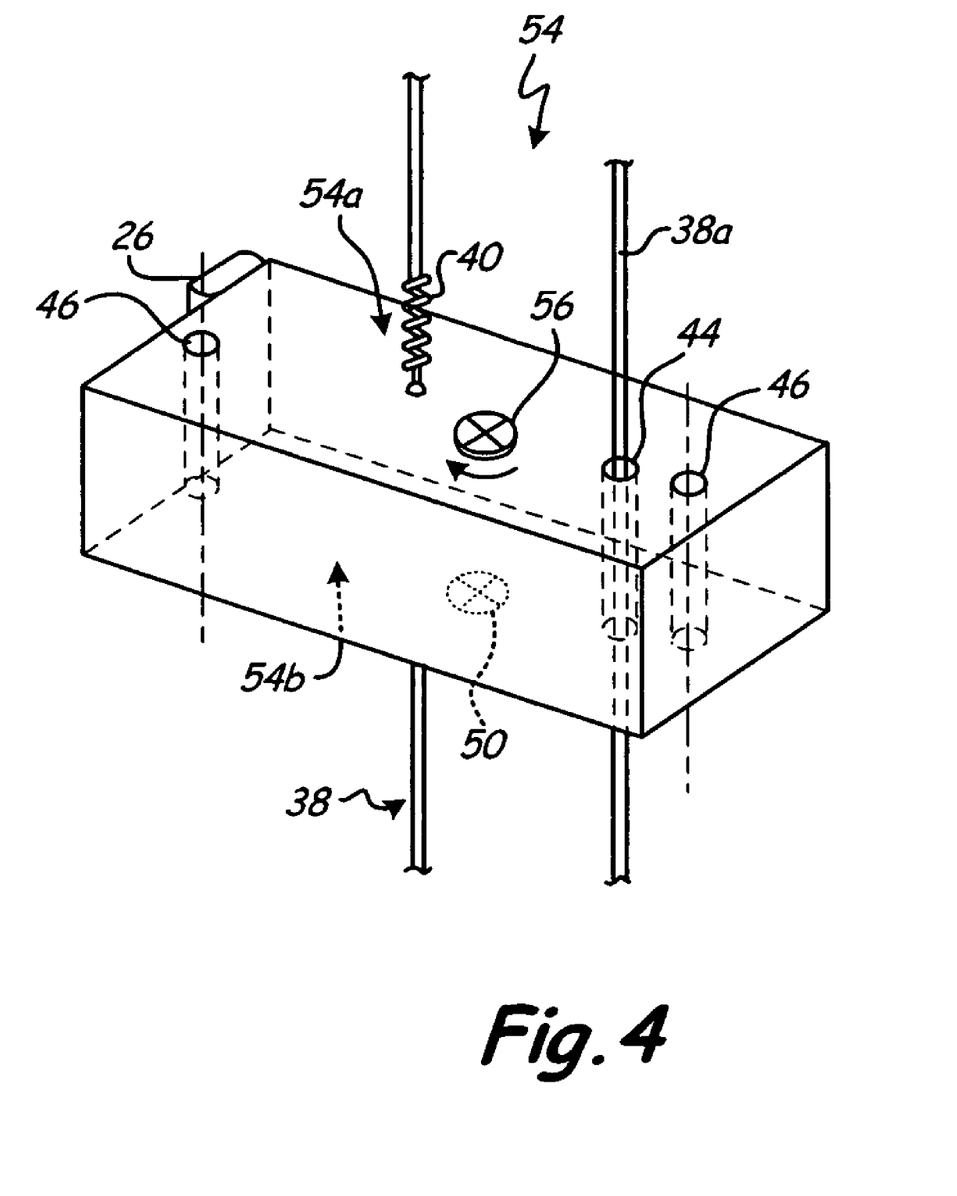
FIG. 4 is a perspective view of an alternative embodiment of an electronic measuring device according to the present invention.

FIG. 4 is a perspective view of an alternative embodiment of an EMD 54 according to the present invention, which EMD 54 includes the rope guide hole 44, the alignment holes 46, a rotating lateral distance sensor 56, and the longitudinal distance sensor 50. The EMD 54 employs one lateral distance sensor 56 configured to measure all four lateral distances between the EMD 54 and the walls 10c, 10d, 10e, 10f of the hoistway 10. The lateral distance sensor 56 may be connected to the EMD 54, for example toward the center of the top 54a of the EMD 54, and may be configured to rotate with respect to the EMD 54 and the hoistway 10. At one or more longitudinal positions of the EMD 54 in the hoistway 10, the lateral distance sensor 56 may be configured to measure multiple lateral distances between the EMD 54 and the walls of the hoistway 10 as the sensor 56 rotates. In this manner, the lateral distance sensor 56 can measure lateral distances between the EMD 54 and the walls of the hoistway in almost 360 degrees; the only locations that may not be measurable are the locations in which the beam (if, for example, the sensor 56 is a laser, radar, etc. emitter) emitted by the sensor 56 is prematurely reflected by either the tension member 40 or the rope 38. The EMD 54 may then determine relevant lateral distances by, for example, selecting the shortest distances between the EMD 54 and the respective four walls 10c, 10d, 10e, 10f of the hoistway 10.

Figure 5:
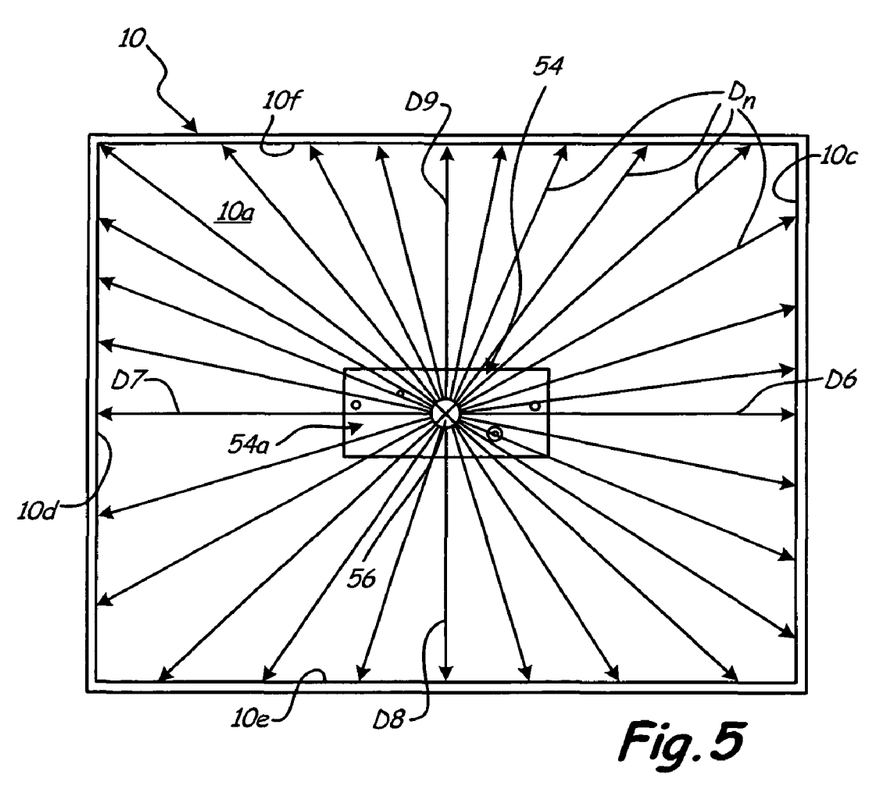
FIG. 5 is a top view of the hoistway illustrating distance measurements made by the electronic measuring device shown in FIG. 4.

FIG. 5 illustrates lateral distance measurements made by the EMD 54 shown in FIG. 4. In FIG. 5, the EMD 54, at a given longitudinal position in the hoistway 10, may measure the lateral distances between the EMD 54 and the four walls of the hoistway 10. For example, the lateral sensor 56 connected to the top 54a of the EMD 54 may measure multiple distances $D_n$ between the EMD 54 and the four walls 10c, 10d, 10e, 10f of the hoistway 10 as the sensor 56 rotates 360 degrees with respect to the EMD 54 and the hoistway 10. The EMD 54 may be configured to determine relevant lateral distances among the multiple distances $D_n$ measured by, for example, selecting the shortest distances D6, D7, D8, D9 between the EMD 54 and the respective four walls 10c, 10d, 10e, 10f of the hoistway 10. The EMD 54 may be substantially centered in the hoistway 10 such that, for example, the lateral sensor 56 is aligned with the vertical axis 52 of the hoistway 10 (see, e.g., FIG. 1).

Embodiments of the present invention also include a method of surveying an elevator hoistway, which method includes electronically measuring one or more lateral distances between a longitudinal reference axis of the hoistway and the walls of the hoistway at one or more positions along the longitudinal reference axis and providing an output based on the lateral distances measured. The longitudinal reference axis from which lateral distances are measured to the hoistway walls may be substantially perpendicular to at least one of a first end and a second end of the hoistway and the lateral distances measured may be substantially perpendicular to the longitudinal reference axis. Moreover, the longitudinal reference axis may be, for example, provided along a side of an electronic measuring device or through a central portion of such an electronic measuring device. Additionally or alternatively, the longitudinal reference axis may be the vertical axis 52 of the hoistway. Providing an output based on the lateral and longitudinal distances measured may include, for example, storing the distances in computer readable form and/or transmitting the distances to a remote electronic device, such as a printer, monitor, or computer. Methods of surveying an elevator hoistway according to the present invention may also include electronically measuring the positions along the longitudinal reference axis of the hoistway and associating one or more of the lateral distances measured with each of the positions along the longitudinal reference axis.

Embodiments of the present invention have several advantages over prior methods of and systems for surveying elevator hoistways. Methods and systems according to the present invention provide a machine assisted automated means for surveying elevator hoistways. Embodiments of the present invention include electronic measuring devices configured to traverse the hoistway and electronically measure critical hoistway dimensions along the length of the hoistway. The EMD is equipped with electronic distance sensors, such as laser or ultrasonic sensors, which provide efficient and accurate distance measurements and which may be connected to an electronic control device, such as an integrated circuit, for automatically storing and transmitting the measured distances. Methods and systems according to the present invention simultaneously reduce the required time for and increase the accuracy of the hoistway survey, which in turn significantly reduces surveying costs in new elevator installations and existing elevator modernizations.

The aforementioned discussion is intended to be merely illustrative of the present invention and should not be construed as limiting the appended claims to any particular embodiment or group of embodiments. Thus, while the present invention has been described in particular detail with reference to specific exemplary embodiments thereof, it should also be appreciated that numerous modifications and changes may be made thereto without departing from the broader and intended scope of the invention as set forth in the claims that follow.

The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims.

The invention claimed is:

1. A device for surveying an enclosed structure comprising:
   a platform configured to longitudinally traverse the structure;
   at least one first distance sensor connected to the platform and configured to measure a lateral distance between a point on the platform and a wall of the structure;

at least one second distance sensor connected to the platform and configured to measure a longitudinal distance between a point on the platform and a first end of the structure; and a transport machine configured to move the platform substantially longitudinally within the structure; wherein the transport machine comprises:

a motor:

a first sheave drivably connected to the motor and configured to be arranged toward the first end of the structure;

a second sheave configured to be arranged toward a second end of the structure; and a traction member connected between the first and the second sheave;

wherein the platform is connected to the traction member.

2. The device of claim 1 further comprising an electronic control connected to the platform and configured to store data from the first and the second distance sensors.

3. The device of claim 2, wherein the electronic control is further configured to transmit the data to a remote electronic device.

4. The device of claim 1 further comprising:

a guide hole in the platform; and a balance weight connected to the platform and arranged opposite the guide hole;

wherein the traction member passes through the guide hole.

5. The device of claim 4, wherein the balance weight is configured to reduce a force exerted by the platform on the traction member passing through the guide hole.

6. The device of claim 1, wherein the first distance sensor is selected from a group consisting of laser and ultrasonic distance sensors.

7. The device of claim 1, wherein the second distance sensor is selected from a group consisting of laser and ultrasonic distance sensors.

8. The device of claim 1 further comprising:

a guide hole in the electronic measuring device; and a balance weight connected to the electronic measuring device and arranged opposite the guide hole;

wherein the traction member passes through the guide hole.

9. The device of claim 8, wherein the balance weight is configured to reduce a force exerted by the electronic measuring device on the traction member passing through the guide hole.

10. A device for surveying an enclosed structure comprising:

a platform configured to longitudinally traverse the structure;

at least one first distance sensor connected to the platform and configured to measure a lateral distance between a point on the platform and a wall of the structure;

at least one second distance sensor connected to the platform and configured to measure a longitudinal distance between a point on the platform and a first end of the structure;

a transport machine configured to move the platform substantially longitudinally within the structure; and an optical alignment system configured to generate an optical longitudinal reference substantially perpendicular to a level lateral surface.

11. The device of claim 10, wherein the optical alignment system comprises:

at least one alignment transmitter and receiver pair, which pair includes a transmitter and a receiver, wherein one of the transmitter and the receiver is arranged toward a first end of the structure and the other of the transmitter and the receiver is arranged either toward a second end of the structure or on the platform, and wherein a beam generated by the transmitter lies in a plane that is substantially perpendicular to the level lateral surface.

12. An elevator hoistway surveying system comprising:

a hoistway;

an electronic measuring device configured to measure one or more lateral distances between a point on the measuring device and the walls of the hoistway at one or more longitudinal positions of the measuring device in the hoistway; and a transport machine configured to cause the measuring device to longitudinally traverse the hoistway; wherein the transport machine comprises:

a motor;

a first sheave drivably connected to the motor and configured to be arranged toward a first end of the hoistway;

a second sheave configured to be arranged toward a second end of the hoistway; and a traction member connected between the first and the second sheave;

wherein the electronic measuring device is connected to the traction member.

13. The system of claim 12, wherein the measuring device comprises:

a platform drivably connected to the transport machine;

at least one first distance sensor connected to the platform and configured to measure one or more lateral distances between one or more corresponding points on the platform and the walls of the hoistway at one or more longitudinal positions of the platform in the hoistway; and at least one second distance sensor connected to the platform and configured to measure the one or more longitudinal positions of the platform in the hoistway.

14. The system of claim 13 further comprising an electronic control connected to the platform and configured to store data from the first and the second distance sensors.

15. The system of claim 13, wherein the first distance sensor is selected from a group consisting of laser and ultrasonic distance sensors.

16. The system of claim 13, wherein the second distance sensor is selected from a group consisting of laser and ultrasonic distance sensors.

17. An elevator hoistway surveying system comprising:

a hoistway;

an electronic measuring device configured to measure one or more lateral distances between a point on the measuring device and the walls of the hoistway at one or more longitudinal positions of the measuring device in the hoistway;

a transport machine configured to cause the measuring device to longitudinally traverse the hoistway; and an optical alignment system configured to generate an optical longitudinal reference substantially perpendicular to a level lateral surface;

wherein the measuring device comprises:

a platform drivably connected to the transport machine;

at least one first distance sensor connected to the platform and configured to measure one or more lateral distances between one or more corresponding points on the platform and the walls of the hoistway at one or more longitudinal positions of the platform in the hoistway; and at least one second distance sensor connected to the platform and configured to measure the one or more longitudinal positions of the platform in the hoistway.

18. The system of claim 17, wherein the optical alignment system comprises:
at least one alignment transmitter and receiver pair, which pair includes a transmitter and a receiver,
wherein one of the transmitter and the receiver is arranged toward a first end of the structure and the other of the transmitter and the receiver is arranged either toward a second end of the structure or on the platform,
wherein a beam generated by the transmitter lies in a plane that is substantially perpendicular to the level lateral surface.

19. A method of surveying an elevator hoistway comprising:
electronically measuring, using a measuring device, one or more lateral distances between a longitudinal reference axis of the hoistway and the walls of the hoistway at a first position along the longitudinal reference axis;
driving the measuring device with a transport machine to a second position along the longitudinal reference axis in the hoistway;
electronically measuring, using the measuring device, one or more lateral distances between the longitudinal reference axis of the hoistway and the walls of the hoistway at the second position along the longitudinal reference axis; and
providing an output based on the lateral distances measured;
wherein the transport machine comprises:
a motor;
a first sheave drivably connected to the motor and configured to be arranged toward the first end of the structure;
a second sheave configured to be arranged toward a second end of the structure; and
a traction member connected between the first and the second sheave;
wherein the platform is connected to the traction member.

20. The method of claim 19, wherein the longitudinal reference axis is substantially perpendicular to at least one of a first end and a second end of the hoistway.

21. The method of claim 19, wherein providing an output based on the lateral distances measured comprises storing the lateral distances measured in computer readable form.

22. The method of claim 19, wherein providing an output based on the lateral distances measured comprises transmitting the lateral distances measured to a remote electronic device.

23. The method of claim 22, wherein the remote electronic device is selected from a group consisting of printer, monitor, and computer devices.

24. The method of claim 19, wherein the lateral distances measured are substantially perpendicular to the longitudinal reference axis.

25. The method of claim 19 further comprising:
associating one or more of the one or more lateral distances measured with the first and second positions along the longitudinal reference axis.

* * * * *

UNITED STATES PATENT AND TRADEMARK OFFICE
CERTIFICATE OF CORRECTION

| | | |
|---|---|---|
| PATENT NO. | : 8,256,582 B2 | Page 1 of 1 |
| APPLICATION NO. | : 12/745269 | |
| DATED | : September 4, 2012 | |
| INVENTOR(S) | : Minglun Qiu | |

It is certified that error appears in the above-identified patent and that said Letters Patent is hereby corrected as shown below:

Title Page, Item (57);

Abstract, Line 3
  Delete ")" after "distance"

Signed and Sealed this
Sixth Day of November, 2012

David J. Kappos
*Director of the United States Patent and Trademark Office*